United States Patent [19]

Barringer, Jr.

[11] Patent Number: 5,408,012

[45] Date of Patent: Apr. 18, 1995

[54] POLYMERS HAVING ENHANCED DURABLE HYDROPHILICITY AND DURABLE REWETTING PROPERTIES AND PROCESS OF PRODUCING THE SAME

[75] Inventor: Lloyd F. Barringer, Jr., Rock Hill, S.C.

[73] Assignee: Comfort Technologies, Inc., Gaston, N.C.

[21] Appl. No.: 68,628

[22] Filed: May 27, 1993

[51] Int. Cl.⁶ .............................................. C08L 77/00
[52] U.S. Cl. ................................ 525/431; 525/437; 525/446; 525/424; 528/33; 528/272
[58] Field of Search ............. 525/437, 446, 424, 431; 528/272, 33

[56] References Cited

U.S. PATENT DOCUMENTS

| | | | |
|---|---|---|---|
| 2,807,865 | 10/1957 | Shippee et al. | 28/76 |
| 3,097,185 | 7/1963 | Armen et al. | 260/45.5 |
| 3,099,631 | 7/1963 | Tanner | 260/2.5 |
| 3,252,880 | 5/1966 | Magat et al. | 204/154 |
| 3,297,786 | 1/1967 | Horowitz | 260/857 |
| 3,328,449 | 6/1967 | Haluska | |
| 3,926,551 | 12/1975 | Okada et al. | 8/115.5 |
| 3,995,998 | 12/1976 | Rowland et al. | 8/115.6 |
| 4,135,877 | 1/1979 | Aikawa et al. | 8/115.5 |
| 4,207,071 | 6/1980 | Lipowitz et al. | 8/115.6 |
| 4,238,193 | 12/1980 | Kisaichi et al. | 8/115.5 |
| 4,331,797 | 5/1982 | Martin | 528/26 |
| 4,584,337 | 4/1986 | Lee et al. | 524/500 |
| 4,613,641 | 9/1986 | Haubennestel et al. | 524/267 |
| 4,614,675 | 9/1986 | Ona et al. | 427/387 |
| 4,640,962 | 2/1987 | Ostrozynski et al. | 525/474 |
| 4,684,709 | 8/1987 | Ona et al. | 528/15 |
| 4,761,445 | 8/1988 | Chiba | 524/262 |
| 4,806,125 | 2/1989 | Dyer | 8/116.1 |
| 4,808,188 | 2/1989 | Ledford et al. | 8/115.68 |
| 4,895,917 | 1/1990 | Gruning | 528/10 |
| 4,921,895 | 5/1990 | Schaefer et al. | 524/379 |
| 4,925,890 | 5/1990 | Leung et al. | 524/133 |
| 4,940,626 | 7/1990 | Rhodes, III et al. | 428/198 |
| 4,966,725 | 10/1990 | Singer et al. | 252/8.8 |
| 5,000,861 | 3/1991 | Yang | 252/8.6 |
| 5,070,171 | 12/1991 | O'Lenick, Jr. | 528/33 |
| 5,132,392 | 7/1992 | DeYoung et al. | 528/272 |

FOREIGN PATENT DOCUMENTS

| | | |
|---|---|---|
| 2088738 | 8/1993 | Canada. |
| 0255205A2 | 5/1987 | European Pat. Off. |
| 0281912A1 | 3/1988 | European Pat. Off. |
| 62-149915 | 12/1985 | Japan. |
| 1005872 | 9/1965 | United Kingdom. |
| 1197567 | 7/1970 | United Kingdom. |

Primary Examiner—John Kight, III
Assistant Examiner—Terressa Mosley
Attorney, Agent, or Firm—Bell, Seltzer, Park & Gibson

[57] ABSTRACT

This invention relates to polymers having enhanced durable hydrophilicity and rewetting properties. The polymer has bonded thereto a hydrophilic copolymer. The copolymer comprises the reaction product of a primary hydroxylate having rewetting properties and a silane. The aliphatic polyamide or polyester polymer has an affinity for the hydrophilic copolymer and has substantially no polymerization with the hydrophilic copolymer. The present invention also provides a process of treating polymers to impart hydrophilicity and rewetting properties.

32 Claims, No Drawings

POLYMERS HAVING ENHANCED DURABLE HYDROPHILICITY AND DURABLE REWETTING PROPERTIES AND PROCESS OF PRODUCING THE SAME

FIELD AND BACKGROUND OF THE INVENTION

The present invention relates to polymers having enhanced and durable hydrophilicity and rewetting properties, and a process of producing the same.

Many polymers such as aliphatic polyamides and polyesters are inherently hydrophobic. There is, however, a need for these polymers to be made durably hydrophilic and to have rewetting properties. There are various recognized methods for enhancing the hydrophilicity of polymers.

Hydrophilicity of polyamides (e.g., nylon) and polyester substrates has been achieved. For example, aliphatic polyamide and polyester polymers can be treated with appropriate hydrophilic add-on agents or coatings. The hydrophilic properties imparted to these substrates, however, are often not durable and are highly dependent on its laundering environment. The detergent employed for laundering may enhance or inhibit the hydrophilic and rewetting properties of the substrate.

It has generally been accepted that if polymers such as polyamides and polyesters can be made permanently hydrophilic it may possess rewetting properties. The converse is thought to be true as well; if a substrate can be made to rewet (i.e., absorb water), then it may be regarded as possessing hydrophilic characteristics.

An art-recognized alternative to add-on agents or coatings is the graft polymerization of the polymer with an appropriate hydrophilic copolymer. For example, U.S. Pat. No. 4,135,877 to Aikawa et al. proposes the graft polymerization of water-soluble vinyl monomers such as acrylic acid, acrylamide and N,N'-methylenebisacrylamide onto polyamide fibers using heat and an aqueous treating solution containing acid. Hydrophobic vinyl monomers have been graft polymerized with nylon, polypropylene and polyesters, such as described, for example in U.S. Pat. Nos. 3,297,786 to Horowitz; 3,099,631 to Tanner; 3,252,880 to Magat et al.; and 3,097,185 to Armen. Often these techniques, however, result in diminished physical properties of the polymer substrate such as hand, fabric strength and thermal regulative properties.

Another alternative is the application of water-soluble polysiloxane-polyether copolymers into the anhydrous melt-spin phase of fiber production prior to extrusion, for example, as proposed in U.S. Pat. Nos. 5,132,392 to DeYoung et al. 4,761,455 to Chiba proposes improved surface appearance and sliding properties of extruded nylon resins. U.S. Pat. No. 4,460,962 to Ostrozynski et al. proposes silicone-sheathed polyester fibers.

It is therefore an object of the present invention to provide a polymer (e.g., aliphatic amide or polyester polymers) having enhanced hydrophilicity, rewetting, and thermal regulative properties, and a process for providing the same.

SUMMARY OF THE INVENTION

This invention relates to polymers having enhanced durable hydrophilicity and rewetting properties. Exemplary polymers include aliphatic polyamide polymers (e.g., nylon) and polyester polymers. The polymer has bonded thereto a hydrophilic copolymer. The copolymer comprises the reaction product of a primary hydroxylate having rewetting properties and a silane. The term "primary hydroxylate" relates to an —OH terminated species having a labile proton, for example, alcohols, alkoxylated alcohols, alkoxylated carboxylic acids, carboxylic acids, alkoxylated amines, alkoxylated thiols and the like. The silane has the formula R'Si-(OR")$_x$ where R' is an alkyl group, alkenyl group, aryl group, substituted alkyl or substituted alkenyl; R" is an alkyl group; and $x \leq 3$. The aliphatic polyamide or polyester polymer has an affinity for the hydrophilic copolymer and has substantially no polymerization with the hydrophilic copolymer. The copolymer has a molecular weight greater than about 2000 g/mol, and preferably greater than about 4000 g/mol.

The present invention also provides a process of treating polymers to impart hydrophilicity and rewetting properties. The process comprises contacting the aliphatic polyamide polymer or polyester polymer with an aqueous treatment bath containing the hydrophilic copolymer comprising the reaction product of a primary hydroxylate and a silane while avoiding polymerization of the polymer with the hydrophilic copolymer.

DETAILED DESCRIPTION OF THE INVENTION

As summarized above, the present invention provides polymers such as aliphatic polyamide or polyester polymers having enhanced durable hydrophilicity and rewetting properties and a process for accomplishing the same. A hydrophilic primary hydroxylate is copolymerized with a silane and is bonded to the polymer without subsequent polymerization.

The polymer is in the form of a fibrous textile substrate; e.g., fiber, web, yarn, thread, sliver, woven fabric, knitted fabric, non-woven fabric, etc. The fibrous textile substrate is impregnated, padded or otherwise contacted with an aqueous bath of the hydrophilic primary hydroxylate/silane copolymer and fixed in the textile substrate in a batch process or any suitable continuous or semi-continuous process using conventional equipment. The textile substrate can be formed solely of the polymer, can be blended in various proportions with each other or with other materials such as cotton. Copolymers and terpolymers of the polymer can also be utilized.

Preferred polymers are aliphatic polyamide polymers and polyester polymers. The term "aliphatic polyamide polymer" used herein and throughout this text includes any long-chain polymeric or copolymeric amide which has incurring amide groups as an integral part of the main polymer or copolymer chain. Exemplary aliphatic polyamides include nylon 6 or poly (caprolactam); nylon 6,6 or poly(hexamethylene/adipic acid) amide; poly(hexamethylene/sebacic acid) amide or nylon 610 and the like.

The term "polyester polymer" used herein and throughout the specification includes highly polymeric, essentially linear polyester. Polyester polymers can include, among others, linear polyesters of aromatic dicarboxylic acids and dihydric compounds such as polyethylene terephthalate, modified polyesters and copolymers, etc.

The primary hydroxylate has rewetting properties and is an —OH terminated species having a labile proton available for reaction with a silane. Exemplary primary hydroxylates are alcohols, carboxylic acids, amines, thiol monomers bearing primary hydroxyl groups, and the like. In order to increase solubility, hydrophilicity and rewetting properties, the primary hydroxylate can be alkoxylated prior to copolymerization, for example, using an alkene oxide such as ethylene oxide, propylene oxide or both.

The silane has the formula $R'Si(OR'')_x$ where $R'$ is an alkyl group, alkenyl group, aryl group, substituted alkyl group or substituted alkenyl group; $R''$ is an alkyl group; and $x \leq 3$.

The hydrophilic primary hydroxylate/silane copolymer of the present invention typically has a molecular weight greater than about 1000 g/mol, preferably greater than about 2000 g/mol and most preferably greater than about 4000 g/mol. The copolymer has the general formula:

$$R'Si(OR'')_{3-x} \atop | \atop (OR''')_x \qquad (I)$$

wherein $R'$, $R''$ and $x$ are as defined above, and $R'''$ is an —OH terminated species having a labile proton available for reaction with the silane.

In an embodiment wherein a charge separation between a positively induced charged substrate in an aqueous medium and the durable rewetting agent is desired, the hydrophilic primary hydroxylate/silane copolymer can possess one or more negative charges i.e., it is an "anionic hydrophilic primary hydroxylate/silane copolymer". The hydrophilic primary hydroxylate/silane copolymer can be made anionic if $R'$ is an ethylenically unsaturated alkylene group, such as an ethylene (vinyl) group or a trialkoxyvinyl silane and is reacted with an ethylenically unsaturated carboxylate, such as acrylic acid.

Equation A illustrates the free radical mechanism employed as one of several ways to impart anionic character to the hydrophilic primary hydroxylate/silane copolymer using acyclic acid as the primary hydroxylate:

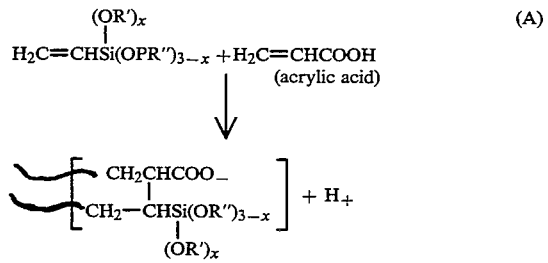

Note that the proton from the primary hydroxylate is ionizable in an aqueous medium to form the anionic termination on the copolymer. Other primary hydroxylates such as maleic anhydride or maleic acid can be directly substituted on an equivalent basis for acrylic acid. By substituting dibasic primary hydroxylates, the anionic nature of the copolymer is doubled by virtue of the dibasic nature thereof; i.e., two equivalents per molecule.

Primary hydroxylates/silane copolymers can be given anionic character by alternate methods involving classical reactions with the copolymer produced in Formula I where $R'$ bears an ethylenically unsaturated alkylene group. Formula II is a general formula for an anionic hydrophilic primary hydroxylate/silane copolymers:

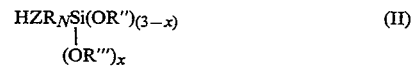

where $Z$ is, but not limited to, phosphate, phosphonate, phosphorylate, sulfonate, sulfate, sulfone, carboxylate groups or hydrogen ions; $R'$ becomes sp$^3$ hybridized $R_N$ by virtue of the addition reaction across the terminal double bonds of $R'$ or is sp$^2$ hybridized when $Z$ is a hydrogen ion. Mixtures of different types of $Z$ are contemplated.

Although applicants do not wish to be bound to any theory, it is believed that the following reaction given in Equation B is occurring between the anionic hydrophilic primary hydroxylate/silane copolymer and the cationically induced amido group to the aliphatic polyamide (nylon):

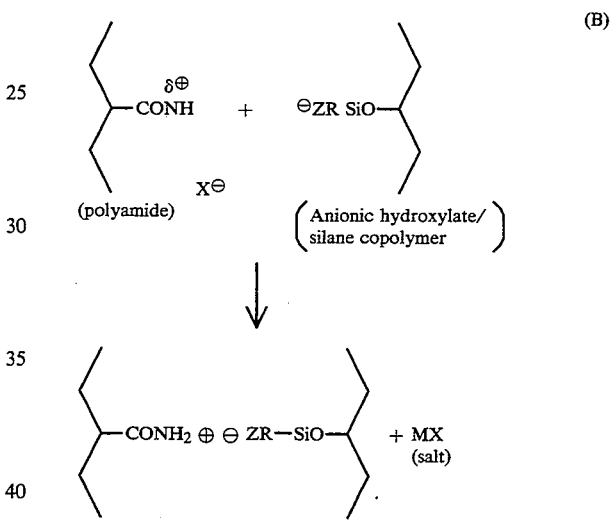

The anionic hydrophilic primary hydroxylate/silane copolymer has an affinity for the polyamide polymer. The bonding is believed to be a combination of electrostatic attraction and intermolecular hydrogen bonding and the structure of the polyamide polymer is not substantially altered.

Other additives and auxiliaries can be included, such as softeners (to improve hand), dispersing agents, wetting agents, UV absorbing agents, IR absorbing agents, antistatic agents, water repellants, antifoaming agents oil-repellant resins and chemicals, fluorescent brightening agents, bacteriostats, fungistats and the like. Alternatively, these and other treatments may be applied to the textile fiber substrate as a post-treatment finish.

In operation, the hydrophilic primary hydroxylate/silane copolymer is applied to the fibers of a textile fabric substrate using a batch-type process at 50° C. to 300° C. at about 1 to about 5 atmospheres of pressure. Pre-scouring of the fibers with a scouring agent such as with nonionic alcohol alkoxylates and derivatives thereof is preferred. Preferably about 0.5 to 3.0 percent based on the weight of the textile substrate of the scouring agent is employed. The prescouring is typically done at 25 to 130° C. for 30 seconds to 2 hours.

The hydrophilic primary hydroxylate/silane copolymer can be prepared from alkoxylated and/or substituted with an anionic group by mechanisms such as phosphonation, phosphation, phosphorylation, sulfonation, sulfation, carboxylation, etc. Combinations of the aforementioned anionic species are acceptable as well. The resulting anionic hydrophilic primary hydroxylate/silane copolymer has a molecular weight of a greater than about 1000 g/mol and typically about 3000–5000 g/mol. This copolymer is synthesized atmospherically at about 100° to 200° C. for 4 to 12 hours and more preferably at 150° C. for about eight hours. The anionic hydrophilic primary hydroxylate/silane copolymer solution can be neutralized with a neutralizing agent from about 2 to 7 and preferably 3 to 5. Exemplary neutralizing agents are weak organic acids such as formic acid and alkaline salts such as potassium hydroxide and potassium carbonate. The amount of neutralizing agent is from about 0.5 to about 5.0 percent based on the weight of the substrate. Whether an acid or base is employed for the particular treatment depends on the desired effect of the mechanism towards the chosen substrate.

A treatment solution of the hydrophilic primary hydroxylate/silane copolymer of 0.5 to 10 percent by weight based on the weight of the textile fabric substrate is prepared. The fabric is passed through a bath with a wet pickup of from about 0.05 to 200 percent based on the weight of the substrate. Optionally, dispersing agents such as aromatic sulfonate/formaldehyde condensates, polycarboxylates and phosphates of alcohols and alkoxylated alcohols can be added. In particular, partially neutralized salts of polyacrylic acid have been employed as dispersing agents in this process; e.g., polyacrylic acid partially neutralized to a pH of about 3 to 4 with potassium hydroxide or potassium carbonate. The application level of such dispersing agents in the actual bath ranges from 0.5 to 5.0 percent based on the weight of the textile fabric substrates. More preferred is an application range of 1.0 to 4.0 percent and most preferably an application range of 2.0 to 3.0 percent based on the weight of the textile substrate.

Additional benefits and advantages of the invention will be apparent from the following illustrative examples.

Nylon Examples

EXAMPLE 1

A 5.0 gram nylon 6,6 skein supplied by Testfabrics, Inc. of Middlesec, N.J. is treated with 10% a solution by weight of the fabric of Ethal DA-6, (decanol ethoxylated with six moles of ethylene oxide), available from Ethox Chemicals, Inc. of Spartanburg, S.C., copolymerized with UC A-151 (triethoxyvinyl silane) available from Union Carbide Corporation of Danbury, Conn. The solution is applied to the nylon 6,6 skein at 100° C. under atmospheric conditions. The treated nylon skein is dried in a fan forced oven at 350° F. for three minutes. Without the use of detergents, the treated skein is washed in accordance to AATCC Test Method 61-1989. This test method serves as a means to conduct fifty accelerated launderings. If the hydrophilic primary hydroxylate/silane copolymer is present after fifty such launderings, the treatment is deemed permanent.

Physical testing is conducted to determine rewetting properties in a modified Draves Wetting Test; (AATCC Test Method 17-1989). The modification is such that the skeins bear a treatment like, for instance, that found herein instead of the presence of a surfactant in the test solution. The wetting solution is water preequilibrated to 25° C. Wetting speed is determined the same as in the standard AATCC Test Method and was observed in this case to be 8.4 seconds after fifty launderings.

EXAMPLE 2

In order to demonstrate the effectiveness of phosphating, the hydrophilic primary° hydroxylate/silane copolymer obtained from the reaction in Example 1, the reaction product is phosphated in an aqueous medium with phosphoric acid (75%). The wetting speed of the treated nylon skein was observed to be greater than sixty seconds after fifty launderings, but demonstrated some durability by rewetting the treated nylon skein in 6.7 seconds after five launderings.

EXAMPLE 3

In order to demonstrate the effectiveness of carboxylating the hydrophilic primary hydroxylate/silane copolymer obtained from the reaction in Example 1, the reaction product is further polymerized with acrylic acid. The wetting speed of the treated nylon skein was observed to be 8.0 seconds after fifty launderings.

EXAMPLE 4

In order to demonstrate the effectiveness of sulfonating, the hydrophilic primary hydroxylate/silane copolymer obtained from the reaction in Example 1, the reaction product is sulfonated with concentrated sulfuric acid. The wetting speed of the treated nylon skein was observed to be greater than sixty seconds after fifty launderings, but demonstrated some durability by rewetting the treated nylon skein in 12.4 seconds after five launderings.

EXAMPLE 5

In order to demonstrate the effectiveness of a copolymer bearing no double bonds. Instead of reacting DA-6 with triethoxyvinyl silane, a methyltrimethoxy silane, available from Union Carbide of Danbury, Conn. as A-163, is substituted. Example 1 is repeated. The wetting speed of the treated nylon skein was observed to be 24.2 seconds after fifty launderings.

EXAMPLE 6

In order to demonstrate the effectiveness of a manifold molecular weight increase in molecular weight on rewetting speeds, a copolymer was obtained by reacting Magnasoft TLC, hexa-alkoxylated polysiloxane available from Union Carbide of Danbury, Conn., a with UC A-151 (triethoxyvinyl silane), also from Union Carbide followed by free radical heteropolymerization acrylic acid. The wetting speed of the nylon skein treated with this polymer was observed to be 2.3 seconds after fifty launderings.

EXAMPLE 7

In order to demonstrate the effectiveness of a mixed copolymer or heteropolymer, an alkoxylated polysiloxane, Magnasoft TLC, is simultaneously reacted with DA-6 and a triethoxylvinyl silane where the polysiloxane and triethoxyvinyl silane are commercially available from Union Carbide. The resultant heteropolymer is further polymerized with maleic anhydride. The wetting speed of the treated nylon skein was observed to be 3.2 seconds after fifty launderings.

EXAMPLE 8

In order to demonstrate the effectiveness of another mixed heteropolymer, a 1:1 molar ratio of DA-6 and succinic acid is condensed. The reaction product is further reacted at a 3:1 molar ratio with A-151 analogous to the reaction in Example 1 and used as an intermediate. This intermediate is reacted with acrylic acid.

Nylon Control

An untreated, unwashed 5.0 gram nylon 6,6 skein was tested for rewetting properties in accordance with a modified Drave's Wetting Test method described in AATCC. The wetting speed in 25° C. water was 60 seconds. An untreated 5.0 gram nylon 6,6 skein washed fifty times without detergent required greater than 60 seconds for wetting as well. Wetting speeds are customarily discontinued at 60 seconds due to inconsistencies beyond that period. All wetting data for the nylon examples is listed in Table 1.

TABLE 1

| | *Draves Rewetting Speeds, seconds | | | | | | | |
|---|---|---|---|---|---|---|---|---|
| | | Example | | | | | | |
| | Control | 1 | 2 | 3 | 4 | 5 | 6 | 7 |
| five launderings | >60 | 0 | 6.7 | 0 | 12.4 | 0 | 0 | 0 |
| fifty launderings | >60 | 8.4 | >60 | 8.0 | >60 | 24.2 | 8.0 | 3.2 |

*Temperature = 25° C.

The examples demonstrate that nylon can be made durably hydrophilic and to have rewetting properties utilizing the present invention.

Polyester Examples

The same chemistries evaluated for rewetting properties on nylon 6,6 skeins were applied to 100% polyester fabric obtained from Dixie Yarns, Inc. of Gastonia, N.C. were cut into swatch form; i.e., 20 gram pieces of fabric cut 11"×8". Polyester fabric was employed rather than skeins due to difficulty in procuring a substrate without a surfactant treatment.

These chemistries were also applied at the same concentrations to the polyester substrate. The treated swatches were dried at 350° F. for three minutes. The 11"×8" polyester fabric swatches were subjected to accelerated launderings as described in a modified AATCC Test Method 61-1989 without detergent. Detergent was left out to avoid interference with the swatches bearing the durable rewetting agents described in these claims. Once washed, the swatches were again dried at 350° F. for three minutes.

Rewetting speed was measured in analogous fashion to those rewetting speeds obtained with the nylon 6,6 skeins. The polyester swatches were bundled to resemble the nylon skeins and dropped into a 1000-ml graduated cylinder containing water pre-equilibrated to 25° C. Timing was initiated once the swatch contacts the water surface and discontinued when the interfacial surface tension was sufficiently reduced so that the swatch begins to submerge like the skein as described in AATCC Test Method 61-1989.

TABLE 2

| | *Draves Rewetting Speeds, seconds | | | | | | | |
|---|---|---|---|---|---|---|---|---|
| | | Example | | | | | | |
| | Control | 1 | 2 | 3 | 4 | 5 | 6 | 7 |
| five launderings | >60 | 4.7 | 0.7 | 1.4 | 1.3 | 4.6 | 1.3 | 3.0 |

TABLE 2-continued

| | *Draves Rewetting Speeds, seconds | | | | | | | |
|---|---|---|---|---|---|---|---|---|
| | | Example | | | | | | |
| | Control | 1 | 2 | 3 | 4 | 5 | 6 | 7 |
| fifty launderings | >60 | 22.9 | 2.6 | 2.5 | 2.8 | 48.7 | 1.9 | 13.7 |

*Temperature = 25° C.

This demonstrates that improved hydrophilicity and thermal regulative properties can be provided by the use of present treatment as compared to the untreated fabric of the control.

In the specification and examples, there have been disclosed preferred embodiments of the invention, although specific terms are employed, they are used in a generic and descriptive sense only and not for the purpose of limitation, the scope of the invention being defined by the following claims.

That which is claimed is:

1. An aliphatic polyamide or polyester polymer having enhanced hydrophilicity and rewetting properties, said polymer having bonded thereto the copolymer of a primary hydroxylate and a silane polymer having the formula $R'Si(OR'')_x$ where $R'$ is an alkyl group, alkenyl group, aryl group, substituted alkyl or substituted alkenyl; $R''$ is an alkyl group; and $x \leq 3$, said copolymer having a molecular weight greater than about 1000 g/mol, said copolymer having an affinity for said aliphatic polyamide polymer, and said aliphatic polyamide polymer having no polymerization with the hydrophilic primary hydroxylate/silane copolymer.

2. The aliphatic polyamide polymer according to claim 1 wherein the copolymer is the reaction product of an hydrophilic primary alcohol and a trialkoxylated vinyl silane.

3. The aliphatic polyamide or polyester polymer according to claim 1 wherein said hydrophilic primary hydroxylate/silane copolymer is phosphonated.

4. The aliphatic polyamide or polyester polymer according to claim 1 wherein said hydrophilic primary hydroxylate/silane copolymer is carboxylated.

5. The aliphatic polyamide or polyester polymer according to claim 1 wherein said hydrophilic primary hydroxylate/silane copolymer is sulfonated.

6. The aliphatic polyamide polymer according to claim 1 wherein the hydrophilic primary hydroxylate/silane copolymer is a copolymer comprising the reaction product of a primary hydroxylate and a silane, and an ethylenically unsaturated carboxylate.

7. A polymer according to claim 1 wherein the hydrophilic primary hydroxylate/silane copolymer has the formula:

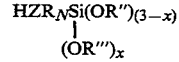

wherein Z is selected from the group consisting of phosphate, phosphonate, phosphorylate, sulfonate, sulfate, sulfone, carboxylate or hydrogen ion; $R_N$ is an $sp^3$ hybridized alkyl group or an $sp^2$ hybridized alkylene group when Z is a hydrogen ion.

8. A polymer having enhanced hydrophilicity and rewetting properties, said polymer having bonded thereto a hydrophilic primary hydroxylate/silane copolymer having a molecular weight greater than about 1000 g/mol and having an affinity for said polymer, the silane portion of said copolymer having the formula R'Si(OR")$_x$ where R' is an alkyl group, alkenyl group, aryl group, substituted alkyl or substituted alkenyl; R" is an alkyl group; and x≦3, said polymer having no polymerization with the hydrophilic primary hydroxylate/silane copolymer.

9. The polymer according to claim 8 wherein the copolymer is the reaction product of an hydrophilic primary alcohol and a trialkoxylated vinyl silane.

10. The polymer according to claim 8 wherein said hydrophilic primary hydroxylate/silane copolymer is phosphonated.

11. The polymer according to claim 8 wherein said hydrophilic primary hydroxylate/silane copolymer is carboxylated.

12. The polymer according to claim 8 wherein said hydrophilic primary hydroxylate/silane copolymer is sulfonated.

13. The polymer according to claim 8 wherein the hydrophilic primary hydroxylate/silane copolymer is a copolymer comprising the reaction product of a primary hydroxylate and a silane, and an ethylnically unsaturated carboxylate.

14. A polymer according to claim 8 wherein the hydrophilic primary hydroxylate/silane copolymer has the formula:

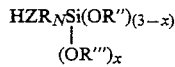

wherein Z is selected from the group consisting of phosphate, phosphonate, phosphorylate, sulfonate, sulfate, sulfone, carboxylate or hydrogen ion; $R_N$ is an sp$^3$ hybridized alkyl group or an sp$^2$ hybridized alkylene group when Z is a hydrogen ion.

15. A polymer according to claim 8 wherein the polymer is a polyester polymer.

16. A polymer according to claim 8 wherein the polymer is an aliphatic polyamide polymer.

17. A process of treating an aliphatic polyamide or polyester polymer to impart hydrophilicity and rewetting properties thereto, the process comprising contacting the aliphatic polyamide or polyester polymer with an aqueous treatment bath containing an anionic hydrophilic primary hydroxylate/silane copolymer having a molecular weight greater than about 1000 g/mol, the silane portion of said copolymer having the formula R'Si(OR")$_x$ where R' is an alkyl group, alkenyl group, aryl group, substituted alkyl or substituted alkenyl; R" is an alkyl group; and x≦3, under conditions sufficient to bond the aliphatic polyamide polymer and the anionic hydrophilic primary hydroxylate/silane copolymer while avoiding polymerization of the aliphatic polyamide polymer with the anionic hydrophilic primary hydroxylate/silane copolymer.

18. The process according to claim 17 wherein said anionic hydrophilic primary hydroxylate/silane copolymer is sulfonated.

19. The process according to claim 17 wherein said anionic hydrophilic primary hydroxylate/silane copolymer is phosphonated.

20. The process according to claim 17 wherein said anionic hydrophilic primary hydroxylate/silane is carboxylated.

21. The process according to claim 17 wherein the copolymer is a copolymer comprising the reaction product of a hydrophilic primary hydroxylate and a silane, and an ethylenically unsaturated carboxylate.

22. The process according to claim 17 wherein the ethylenically unsaturated carboxylate is acrylic acid.

23. The process according to claim 17 wherein the hydrophilic primary hydroxylate/silane copolymer has the formula:

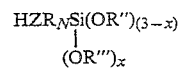

wherein Z is selected from the group consisting of phosphate, phosphonate, phosphorylate, sulfonate, sulfate, sulfone, carboxylate or hydrogen ion; $R_N$ is an sp$^3$ hybridized alkyl group or an sp$^2$ hybridized alkylene group when Z is a hydrogen ion.

24. A process of treating a polymer to impart hydrophilicity and rewetting properties thereto, the process comprising contacting the polymer with an aqueous treatment bath containing a hydrophilic primary hydroxylate/silane copolymer having a molecular weight greater than about 1000 g/mol, the silane portion of said copolymer having the formula R'Si(OR")$_x$ where R' is an alkyl group, alkenyl group, aryl group, substituted alkyl or substituted alkenyl; R" is an alkyl group; and x≦3, under conditions sufficient to bond the polymer and the hydrophilic primary hydroxylate/silane copolymer while avoiding polymerization of the polymer with the hydrophilic primary hydroxylate/silane copolymer.

25. The process according to claim 24 wherein said anionic hydrophilic primary hydroxylate/silane copolymer is sulfonated.

26. The process according to claim 24 wherein said anionic hydrophilic primary hydroxylate/silane copolymer is phosphonated.

27. The process according to claim 24 wherein said anionic hydrophilic primary hydroxylate/silane is carboxylated.

28. The process according to claim 24 wherein the copolymer is a copolymer comprising the reaction product of a hydrophilic primary hydroxylate an a silane, and an ethylenically unsaturated carboxylate.

29. The process according to claim 24 wherein the ethylenically unsaturated carboxylate is acrylic acid.

30. The process according to claim 24 wherein the hydrophilic primary hydroxylate/silane copolymer has the formula:

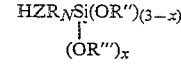

wherein Z is selected from the group consisting of phosphate, phosphonate, phosphorylate, sulfonate, sulfate, sulfone, carboxylate or hydrogen ion; $R_N$ is an sp$^3$ hybridized alkyl group or an sp$^2$ hybridized alkylene group when Z is a hydrogen ion.

31. The process of claim 24 wherein the polymer is a polyester polymer.

32. The process of claim 24 wherein the polymer is an aliphatic polyamide polymer.

* * * * *